United States Patent Office 3,563,926
Patented Feb. 16, 1971

3,563,926
PROCESS FOR PRODUCING WATER-SOLUBLE
SYNTHETIC RESINS
Heinrich W. Lackner, Graz, Austria, assignor to Vianova-Kunstharz, A.G., Graz, Austria, an Austrian company
No Drawing. Continuation-in-part of application Ser. No. 698,108, Jan. 16, 1968. This application May 24, 1968, Ser. No. 731,696
Claims priority, application Austria, June 21, 1967, A 5,760/67
Int. Cl. C08g 5/18, 9/36
U.S. Cl. 260—19                           16 Claims

ABSTRACT OF THE DISCLOSURE

An improved process for preparing water-soluble resins comprising the reaction product of (I) the pre-condensate of (a) a resinous epoxide, and (b) a heat-reactive composition which contains free or blocked methylol groups; and (II) polycarboxylic acids or their anhydrides is described. According to the process, one component of the heat-reactive composition is initially reacted with the resinous epoxide with the pre-condensate being thereafter formed by the addition of an aldehyde, and/or a reactive aldehyde condensate. Water solubility is imparted to the resins obtained by the addition of a nitrogen base.

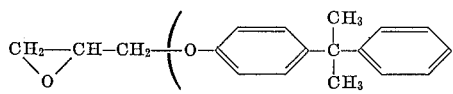

The present application is a continuation-in-part of application Ser. No. 698,108 filed Jan. 16, 1968.

My copending application Ser. No. 698,108 is directed to the production of water-soluble synthetic resins from pre-condensates which are produced from epoxy-containing compounds (resin component I) with heat-reactive resins (resin component II). The pre-condensates are reacted with polycarboxylic acids and serve, after addition of water-soluble inorganic or organic bases, as water-soluble vehicles for the production of pigmented or unpigmented coating materials which have utility with known application methods.

When producing the heat-reactive pre-condensates according to copending application Ser. No. 698,108, resin component I is reacted with resin component II which carries free or blocked methylol groups. The hydroxy groups of resin component I resulting at least partially from the splitting of the oxirane groups are then used for reaction with a polycarboxylic acid or polycarboxylic acid anhydride. Upon addition of a base, water-soluble synthetic resins are obtained.

Surprisingly it has now been found that the process for the formation of the pre-condensates can be conducted very exactly, and with excellent quality control, if the epoxy carrying resin component I is initially reacted with a compound utilized in the production of resin component II. The heat-reactive pre-condensate is thereafter obtained merely by condensation with an aldehyde and/or a reactive aldehyde condensate.

The improved process is of primary importance in that when producing the pre-condensates, specially with phenols, their (phenolic) hydroxy groups react exclusively with the epoxy groups in a controllable way, so that the alkylol groups formed by the subsequent condensation with aldehydes are completely available for the hardening reaction. The aldehydes used for condensation can be replaced completely or partially by aldehyde-condensation products of phenols and/or amino compounds, which are suitable for the production of resin component II as described in my copending application Ser. No. 698,108.

The epoxy compounds, or resin component I, suitable for use in the present invention are those noted in application Ser. No. 698,108 and basically are polyethers containing epoxy groups obtained by the condensation of halohydrins with dihydric alcohols and phenols, and preferably with phenols having fused or separated multiple nuclei, in the presence of alkalis. These compounds can be obtained from glycols, such as ethylene glycol, diethylene glycol, triethylene glycol, propylene glycol-1,2, propylene glycol-1,3, butylene glycol-1,4, pentane diol-1,5, hexane diol-1,6, and particularly from diphenols, such as resorcinol, brenzcatechol, hydroquinone, 1,4-dihydroxynaphthalene, bis-(4-hydroxyphenyl)-methane, bis-(4-hydroxyphenyl)-methylphenylmethane, bis-(4-hydroxyphenyl)-tolylmethane, 4,4'-dihydroxydiphenyl and 2,2-bis(4-hydroxyphenyl)-propane.

The polyethers carrying epoxy groups have the following general formula:

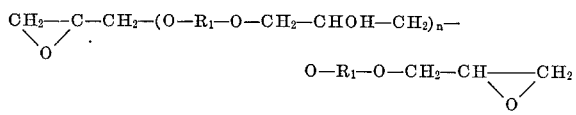

wherein $R_1$ designates an aliphatic or aromatic hydrocarbon radical and $n$ is zero or a positive integer of from 1-10. Of special importance are polyethers containing epoxy groups of the general formula:

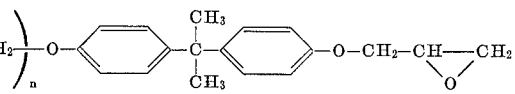

obtained by the reaction of 2,2-bis(4-hydroxyphenyl)-propane and epichlorohydrin in an alkaline medium. Polyethers of the aforesaid types will preferably have a molecular weight of from about 400 to 3,000.

For electrophoretic coating materials preferably polyethers having a molecular weight of from 300 to about 1,000 are used. Polyethers with a higher molecular weight can be employed, however, processing is somewhat difficult due to the high initial viscosity of the resin systems. For the conventional methods of application, higher molecular weight polyethers are preferred.

Other examples of polyethers which can be used are produced by the reaction of novolaks based on phenol, cresol, xylenol or bisphenols with epichlorohydrin, as well as a number of compounds carrying epoxy groups. Such epoxy compounds suitable for the present invention have a molecular weight of up to about 3,000 and are described in "Epoxyverbindungen and Epoxyharze," by A. M. Paquin, Springer Verlag 1958, Berlin, Gottingen, Heidelberg.

The heat-reactive resin (resin component II) described in application Serial No. 698,108 comprised components reactive with an epoxide group of resin component I and, additionally, contained functionality further condensable by cross-linking during the stoving process. Such resins included the reaction products of an aldehyde and a phenol, melamine, or urea, as well as various etherified or non-etherified methylol compounds of co-polymers of acryl amide or methacryl amide, and the like. Essentially, the heat-reactive product is the same in the present instance. However, according to this invention, as noted hereinbefore, one component of the heat-reactive compounds, i.e., the phenol, melamine, urea, or the like, is initially reacted with the polyepoxide (resin component I). Preferred compounds for the initial reaction with resin component I are diphenols such as the dihydroxydiphenyl alkanes and the alkane derivatives such as bis-(4-hydroxyphenyl) methane, bis-(4-hydroxyphenyl) methylphenyl methane, bis-(4-hydroxyphenyl)-tolyl methane, 4,4'-dihydroxydiphenyl, and 2,2-bis(4-hydroxyphenyl) propane; resorcinol, hydroquinone, and 1,4-dihydroxy naphthalene; amino compounds reactive with an aldehyde to form a condensate, such as amino triazines and their derivatives; polycarboxylic acid amides and imides including urea and its derivatives, and co-polymers of acryl amide and methacryl amide. The formation of the pre-condensate is completed by the addition of an aldehyde. Such aldehydes include the simple aldehydes, such as formaldehyde; compounds which break down to formaldehyde such as paraformaldehyde, formalin, and the like, acetaldehyde, hexaldehyde, etc., as well as the reactive aldehyde resins of phenols and amino compounds. Moreover, it is at times preferable, particularly when the water-soluble resins are to be applied by electrodeposition, to etherify the formed alkylol groups completely or partially with mono- or polyhydric alcohols such as butanol, methanol, propanol, ethanol, ethylene glycol, trimethylol propane, and similar substances alone or as admixtures.

When carrying out the process of the present invention, it can be advantageous under certain circumstances to reduce the epoxy groups of resin component I to a maximum of two epoxy groups per molecule in known manner. This can be effected, e.g., by reacting resin component I with compounds carrying esterifiable carboxy groups. Suitable compounds are saturated and/or unsaturated, straight chain and/or branched aliphatic and/or cyclic carboxylic acids, preferably with more than 4 carbon atoms, as well as derivatives of polybasic carboxylic acids with all but one free carboxy groups being blocked, e.g., monoesters of dicarboxylic acids, etc.

The pre-condensates of resin components I and II still containing reactive or functional hydroxy groups, are reacted with polybasic carboxylic acids or their anhydrides, again as described in Ser. No. 698,108. Polybasic carboxylic acids suitable for use in the present invention, alone or in mixtures, are saturated or unsaturated di-, tri-, and polybasic carboxylic acids or anhydrides, such as oxalic acid, adipic acid, maleic acid, phthalic acid, trimellitic acid, maleic anhydride and phthalic anhydride. Polybasic carboxylic acids or anhydrides preferred in the present process are adducts of $\alpha,\beta$-ethylenically unsaturated dicarboxylic acids or anhydrides with fatty acids or mixtures of fatty acids, such as oleic acid, linolenic acid, the fatty acids of cottonseed oil, perilla oil, tung oil, oiticica oil, linseed oil, soya oil, dehydrated castor oil, tall oil fatty acids and rosin acids, and also their esters with diols, triols and polyols, alone or in combination with rosin acids, in their original form or in polymerized form. It is particularly advisable to polymerize the adduct-forming compounds, if the functionality of this material is to be increased without changing the ratio of fatty acid to anhydride. Due to this measure, highly functional products with numerous anhydride groups in the molecule can be produced, which have, at the same time, a high content of oil.

In the production of the adduct the ratio of the anhydride to the adducting compound can be varied greatly. Since in most cases natural drying oils are used, the resulting adduct will also serve to plasticize the films. Optimal mechanical film properties are achieved with a ratio of the anhydride to oil of between 1:2 and 1:6, and preferably 1:4. The adduct is formed in a known manner. It can be advisable to hydrolyze the anhydride groups of the adduct before it is reacted with the pre-condensate. According to this invention, the above adducts can be modified with other $\alpha,\beta$-unsaturated compounds, such as styrol, vinyl tolyol, acrylic acid, methacrylic acid, and similar substances, or with mixtures thereof.

The reaction products are neutralized with inorganic and organic bases, alone or in mixtures. Nitrogen bases, such as ammonia, triethyl amine, diethyl amine, trimethyl amine, piperidine, morpholine, dimethyl ethanol amine, diethanol amine, triethanol amine, ethylene diamine, diethylene triamine, triethylenetetramine, pentamethylenediamine, and polyhydroxy polyamines, such as N,N,N',N',N''-pentakis-(2-hydroxypropyl) - diethylene triamine are preferred. The product becomes water soluble at a pH-value of 6.5; with a pH-value of 7.0–7.5, the obtained solutions are clear. Water-tolerant organic solvents can be co-employed.

Of the synthetic resins of the present invention, the application properties of which may optionally be improved by co-employing suitable organic solvents, water-soluble unpigmented or pigmented coating materials can be produced. The coating media can be applied according to known industrial application methods, such as dipping, spraying, flow-coating including electrodeposition. Electro-deposited coatings can be stoved at relatively low temperatures, the films obtained showing excellent mechanical and anti-corrosive properties.

Having described the invention in general terms, the following examples serve to more fully illustrate the process of the invention. Parts are by weight unless indicated otherwise.

EXAMPLE 1

(a) Pre-condensate 420 gm. of an epoxy resin produced in known manner from 4,4'-dihydroxydiphenylpropane and epichlorohydrin, with an epoxy equivalent of 190–210 and a melting range of 8–12° C., 228 gm. 4,4'-dihydroxydiphenylpropane and 280 gm. dehydrated castor oil fatty acid are melted in a reaction vessel on a steam bath. After the mass has become liquid, 2 gm. triethyl amine are added and the temperature is raised to 130° C. The temperature is held at from 130–140° C. for 2–3 hours until the acid number has fallen below 1 and no free epoxy groups can be traced. Then the temperature is reduced to 70° C., and 88 gm. butanol and 60 gm. of 96 percent paraformaldehyde are added. The mass is stirred for 6 hours at 60–70° C., whereby it becomes clear and the content of free formaldehyde falls below 2 percent.

212 gm. (0.2 mols) of the clear resin solution thus obtained are heated to 200° C., with 44 gm. p-tert. butyl phenol resol (produced in known manner from 30 gm. p-tert. butyl phenol and 13 gm. 100 percent formaldehyde) and condensed for about 2 hours at from 200–210° C., whereby a total of 40 gm. of a mixture of butanol and water will distill. The mass is cooled to 130° C. and diluted with 66 gm. diethylene glycol diethyl ether.

(b) Carboxy compound 300 gm. high-grade linseed oil and 100 gm. dehydrated castor oil are heated to 200.° C. together with 100 gm. maleic anhydride. The temperature is maintained until no free maleic anhydride is present. The temperature is reduced to 90° C. and a mixture of 18 gm. water and 2 gm. triethyl amine is added in portions. The temperature is held at 90–95° C. for two hours. After this time, no free anhydride groups can be traced.

(c) Reaction of the pre-condensate 330 gm. of the carboxylic compound (b) are mixed with stirring with 282 gm. of the pre-condensate (a) and the temperature raised and held at 115–120° C. for 2–3 hours. After about 2 hours a sample will become completely soluble in water after addition of diethyl amine at a pH-value of 7.5. After another hour, a sample diluted to 50 percent solid content with monoethylene glycol monobutyl ether will have a viscosity of 140–160" 4 DIN 53 211. When this viscosity range is obtained, the condensation is finished and the batch is diluted to a solid content of 67 percent with isopropyl glycol.

(d) Electrodeposition 166 gm. of the resin solution (c) are ground with 35 gm. red iron oxide on a triple roller mill and adjusted to a pH-value of 7.5 with diethyl amine. The resultant paste is diluted with water such that a solid content of 10 percent is obtained. The conductivity of the paint is about 1200 myS with a pH-value of 7.5 and a temperature of 25° C.

The paint is applied under the conditions noted in Ser. No. 698,108 and after stoving (30 minutes at 180° C.) gives a film with excellent mechanical properties and an outstanding salt spray resistance.

EXAMPLE 2

(a) Pre-condensate 440 gm. of the epoxy resin used in Example 1, containing about 2 mol epoxy groups, are dispersed in 170 gm. (1 mol) of a synthetic fatty acid in which 90 percent of the carboxyl groups are attached to a tertiary carbon atom, and which has an acid number of 300 mg. KOH/gm. The mixture is heated to 130–140° C. after addition of 0.5 gm. triethyl amine. Then the temperature is held until the acid value falls below 1. The batch is cooled to 100° C., and 60 gm. urea, 320 gm. butanol, 15 gm. water, and 0.5 gm. triethyl amine are added. The temperature is raised to 120–125° C. and held until a sample of the resin is clear when cold; during the reaction the added water is removed azeotropically. At 80° C. 70 gm. 96 percent paraformaldehyde are added; after adjustment of the pH-value to 7.2–6.8 with 1–2 gm. phthalic anhydride, the batch is condensed at 80° C. until the content of free formaldehyde falls below 2 percent. Then the resin is concentrated to a solid content of 80 percent under a vacuum of at least 15 mm. Hg.

(b) Polycarboxylic acid 560 gm. dehydrated castor oil fatty acid, 560 gm. soya bean oil fatty acid, 140 gm. pentaerythritol are esterified at 240° C. until the acid value has fallen below 5. Then at 200° C., 220 gm. maleic anhydride are added, and the mixture is held at this temperature until no free maleic anhydride can be traced.

(c) Reaction of the pre-condensate 600 gm. of the polycarboxylic acid of 2(b) above are heated to 80–90° C. with 250 gm. of the pre-condensate according to 2(a) in a suitable reaction vessel until a sample is completely soluble in water after addition of triethyl amine, at a pH-value of 7.5–7.8.

(d) Electrodeposition

The preparation of a paint and the electrodeposition are carried out as described in 1(d). The applied films can be cured at temperatures above 100° C.

EXAMPLE 3

(a) Pre-condensate 140 gm. dehydrated castor oil fatty acid (1.5 mols), 140 gm. linseed oil fatty acid (0.5 mol) are heated to 100° C. with an inert gas sparge, then 180 gm. 2,3,5,6-diepoxydicyclopentadiene (1.1 mol) are added. As soon as the solution is clear, 228 gm. 4,4′-dihydroxydiphenyl propane (1 mol) are added and the temperature is raised to 220° C. After a reaction time of 2–3 hours at this temperature, the epoxy number has fallen to 0. The acid number lies below 20 mg. KOH/gm.

206.4 gm. of this intermediate product are mixed with 83.6 gm. of a clear solution of formaldehyde in secondary butanol, about 19.4 percent solids (prepared through slight heating of 54 gm. 91 percent paraformaldehyde, 196.8 gm. secondary butanol, 1 gm. triethyl amine and 3.2 gm. water), and held for 12–16 hours at 85–90° C. until the content of free formaldehyde has fallen from 5.5 percent at the beginning of the heating to below 2.5 percent.

(b) Carboxy compound 265 gm. linseed oil and 134 gm. dehydrated castor oil are heated to 280° C. and held until a viscosity of 90–100″ 4 DIN 53 211 is obtained. At 200° C., 100 gm. maleic anhydride are added and the temperature held at 200° C. for about 2 hours until 90 percent of the maleic anhydride have reacted. Then 75 gm. tung oil are added and the temperature held at 190–200° C. for an additional 1–2 hours until no free maleic anhydride can be traced.

(c) Reaction of the pre-condensate 575 gm. of the carboxy compound 3(b) are mixed with 18 gm. water and 1 gm. triethyl amine and held at 100–120° C. until no free anhydride groups can be seen in the infra-red spectrum. Then at 110° C. 300 gm. of the pre-condensate 3(a) are added and the temperature is raised at a rate of 10° C. per hour to 120–125° C. After about 3 hours the product becomes water soluble upon addition of triethyl amine; after 4–5 hours, with an acid number of 130–140 mg. KOH/gm., the viscosity is approximately 400–500 cp. (measured as a 50 percent solution in ethylene glycol monobutyl ether) which is the preferred range for optimal film properties. During this phase about 16–19 cc. water and secondary butanol are distilled off. When the desired viscosity is reached the batch is diluted with ethylene glycol monoethyl ether to 80 percent solid content.

EXAMPLE 4

(a) Pre-condensate 140 gm. dehydrated castor oil fatty acid (0.5 mol), 140 gm. linseed oil fatty acid (0.5 mol) are heated to 100° C., with inert gas, then 180 gm. of 2,3,5,6-diepoxydicyclopentadiene (1.1 mol) are added. As soon as the solution is clear, 228 gm. (1 mol) 4,4′-dihydroxydiphenylpropane are added and the temperature is raised to 200° C. After 2–3 hours of reaction time, the epoxy number has fallen to 0. The acid value is below 20 mg. KOH/gm.

206.4 gm. of the intermediate product are reacted 8–12 hours at 85–90° C. with 144 gm. butyl phenol resol, produced in known manner from 90 gm. butyl phenol according to Example 1 of copending application Ser. No. 698,108 until a viscosity of 2500–3000 cp. (80 percent solution in diacetone alcohol) is obtained. Then the batch is dissolved with 54.6 gm. diacetone alcohol to obtain an 80 percent solution.

(b) The carboxy compound is prepared as described in Example 3(b)

(c) Reaction of the pre-condensate 575 gm. of the carboxy compound 3(b) are mixed with 18 gm. water and 1 gm. triethyl amine and held at 100–120° C. until no free anhydride groups are found in the infra-red spectrum. After addition of 250 gm. of the Pre-condensate 4(a) (80 percent solid content) the temperature is gradually raised from 100° C. to 125° C. After about 4 hours the product becomes water soluble after addition of triethyl amine, after 5 hours the viscosity of the product is at 500–600 cp. (50 percent ethyleneglycol monobutyl ether) which is preferred for optimum film properties. The acid number is 150–140 mg. KOH/gm. During this phase 20–25 cc. of a mixture of water and solvents will distill. The resin is diluted to 80 percent solid content with isopropylglycol.

EXAMPLE 5

224 gm. nonenyl succinic anhydride (1 mol) are mixed with 18 gm. water and 1 gm. diethyl amine and held at 100–120° C. until no free anhydride groups can be seen in the infra-red spectrum. Then 300 gm. of the pre-condensate 3(a) are added and the temperature is raised to 140–165° C. After 1–2 hours the product becomes water soluble upon addition of triethyl amine and after 4 hours a viscosity of 200 cp. (80 percent solution in ethylene glycol monoethyl ether) is obtained. The batch is diluted to 80 percent solid content with ethylene glycol monoethyl ether.

The resin solutions prepared according to Examples 3–5 are infinitely soluble with water after neutralization with, e.g., diethyl amine to a pH-value of 7.0–7.1. The pH-value of a 10 percent solution in distilled water is measured. The paints obtained after dilution with water to a solid content of 40 percent can be stoved as unpigmented or pigmented coatings at 160–200° C. to deep gloss, hard films with outstanding flexibility and with excellent adhesion to light metals. Due to the high electrical resistance, these paints can also be used as insulating varnishes. By dilution to a solid content of 10 percent with deionized water, the resin solutions can be used as clear varnishes or paints for electro-deposition with excellent application properties.

As will be apparent to one skilled in the art, numerous modifications can be made in the utilization of the process for preparing water-soluble compositions and in the water-soluble compositions without departing from the inventive concept herein described. Such modifications being within the ability of one skilled in the art are intended to be covered herein with the invention only being limited by the appended claims.

It is claimed:

1. A process for producing water-soluble synthetic resins comprising (A) heating a resinous epoxide having a maximum of two epoxide groups per molecule and a molecular weight of from 200–3,000 with an active hydrogen containing component selected from the group consisting of a diphenol and an amino compound, said diphenol and amino compound being reactive with an aldehyde to form a condensate, thereby forming an initial reaction product and thereafter reacting said initial reaction product with an aldehyde to form a pre-condensate (I); (B) reacting said precondensate (I) with a polycarboxylic acid or its anhydride (II), and (C) adding a nitrogen base to the product of (I) and (II) to form a resinous water-soluble product.

2. The process of claim 1 further characterized in that the resinous epoxide has a molecular weight from 300 to 1,000.

3. The process of claim 1 wherein the diphenol has only one nuclei.

4. The process of claim 1 wherein the diphenol has two nuclei.

5. The process of claim 1 wherein the diphenol is substituted with a lower alkyl group.

6. The process of claim 1 wherein the active hydrogen containing component is 2,2-bis(4-hydroxylphenyl) propane.

7. The process of claim 1 wherein the active hydrogen containing component is urea.

8. The process of claim 1 wherein the alkylol groups formed by condensation of the aldehyde are etherified with an alcohol.

9. The process of claim 1 wherein the alcohol is a polyhydric alcohol.

10. The process of claim 12 further characterized in that the aldehyde is formaldehyde.

11. The product made by the process of claim 12.

12. The process of claim 1 wherein the aldehyde is present as a reactive aldehyde condensate.

13. The process of claim 12 further characterized in that the aldehyde condensate is an aldehyde-phenol condensate.

14. The process of claim 12 further characterized in that the aldehyde condensate is an aldehyde-amino condensate.

15. The process according to claim 1 further characterized in that the polycarboxylic acid is an adduct of $\alpha,\beta$-ethylenically unsaturated dicarboxylic acids, or an anhydride of said acids, with unsaturated fatty acids, fatty acid esters, and mixtures thereof.

16. The process according to claim 15 further characterized in that maleic anhydride is the $\alpha,\beta$-ethylenically unsaturated dicarboxylic acid.

References Cited

UNITED STATES PATENTS

| | | | |
|---|---|---|---|
| 3,464,939 | 9/1969 | Van Westrenen | 260—18X |
| 3,399,153 | 8/1968 | Sekmakas et al. | 260—21 |
| 3,367,991 | 2/1968 | Hicks | 260—21 |
| 3,345,312 | 10/1967 | Cline | 260—21 |
| 2,907,734 | 10/1959 | Greenlee | 260—19X |
| 3,254,042 | 5/1966 | Cogswell | 260—23 |
| 2,897,165 | 7/1959 | Rowland et al. | 260—19 |
| 2,848,431 | 8/1958 | Dean et al. | 260—19 |

HOSEA E. TAYLOR, Primary Examiner

C. W. IVY, Assistant Examiner

U.S. Cl. X.R.

204—181; 260—18, 21, 29.3, 29.4

UNITED STATES PATENT OFFICE
CERTIFICATE OF CORRECTION

Patent No. 3,563,926            Dated February 16, 1971

Inventor(s) Heinrich W. Lackner

It is certified that error appears in the above-identified patent and that said Letters Patent are hereby corrected as shown below:

Column 2, line 21, the formula should appear as shown below:

Column 7, claim 2, line 2, "resinousexpoxide" should read -- resinou epoxide --. Column 8, claim 9, line 1, "claim 1" should read -- clai1 8 --; claim 10, line 1, "claim 12" should read -- claim 1 --; and clair line 1, "claim 12" should read -- claim 1 --.

Signed and sealed this 30th day of May 1972.

(SEAL)
Attest:

EDWARD M.FLETCHER,JR.          ROBERT GOTTSCHALK
Attesting Officer                Commissioner of Patents